(12) United States Patent
Nakajima et al.

(10) Patent No.: US 7,564,441 B2
(45) Date of Patent: *Jul. 21, 2009

(54) DATA PROCESSING CIRCUIT, DISPLAY APPARATUS, AND PORTABLE TERMINAL

(75) Inventors: Yoshiharu Nakajima, Kanagawa (JP); Yoshitoshi Kida, Kanagawa (JP); Hiroaki Ichikawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 570 days.

This patent is subject to a terminal disclaimer.

(21) Appl. No.: 11/207,352

(22) Filed: Aug. 19, 2005

(65) Prior Publication Data

US 2006/0012557 A1   Jan. 19, 2006

Related U.S. Application Data

(63) Continuation of application No. 10/485,293, filed as application No. PCT/JP03/06658 on May 28, 2003, now Pat. No. 6,958,716.

(30) Foreign Application Priority Data

May 31, 2002   (JP) .............................. 2002-159030

(51) Int. Cl.
   *G09G 3/36*  (2006.01)
(52) U.S. Cl. ........................................ 345/100; 326/80
(58) Field of Classification Search .................. 345/99, 345/100, 98, 204; 341/100; 326/80; 327/333; 359/284, 289

See application file for complete search history.

(56) References Cited

U.S. PATENT DOCUMENTS 6,392,628 B1 *   5/2002   Yamazaki et al. .............. 345/98
6,958,716 B2 * 10/2005   Nakajima et al. ........... 341/100

FOREIGN PATENT DOCUMENTS

| JP | 04-372220 | 12/1992 |
| JP | 05-191751 | 7/1993 |
| JP | 08-278479 | 10/1996 |
| JP | 2003-037492 | 2/2003 |

\* cited by examiner

*Primary Examiner*—Abbas I Abdulselam
(74) *Attorney, Agent, or Firm*—Robert J. Depke; Rockey, Depke & Lyons, LLC (57) ABSTRACT

When a data processing circuit is formed on an insulating substrate by using TFTs, it is difficult to process a data signal having a high data rate, such as digital display data, at a high speed.

In a data processing circuit formed on an insulating substrate by using TFTs, a data signal having a small voltage amplitude input in series is increased in level to a data signal having a large voltage amplitude by a level shift circuit (11), the serial data signal having the large voltage amplitude is converted to parallel data signals by a serial-parallel conversion circuit (12), and then, the parallel data signals are reduced in level to data signals having a small voltage amplitude by level shift circuits (13A and 13B). Therefore, high-speed processing can be applied to digital data signals at a low power consumption.

5 Claims, 7 Drawing Sheets

DATA PROCESSING CIRCUIT, DISPLAY APPARATUS, AND PORTABLE TERMINAL

The subject matter of application Ser. No. 10/485,293 is incorporated herein by reference. The present application is a continuation of U.S. application Ser. No. 10/485,293, filed Jan. 29, 2004 now U.S. Pat. No. 6,958,716, which claims priority to Japanese Patent Application No. JP2002-159030, filed May 31, 2002, and WIPO Patent Application No. PCT/JP03/06658, filed May 28, 2003. The present application claims priority to these previously filed applications.

TECHNICAL FIELD

The present invention relates to data processing circuits, display apparatuses, and portable terminals, and more particularly, to a data processing circuit for processing a digital data signal having a high data rate, a display apparatus which uses the data processing circuit as one of peripheral driving circuits for a display section, and a portable terminal on which the display apparatus is mounted as an image display section.

BACKGROUND ART

In the field of flat-panel-type display apparatuses, typical of which are liquid-crystal display apparatuses and EL (electroluminescence) display apparatuses, so-called driving-circuit-united-type display apparatuses have been developed in order to make the frames of the panels smaller and make the panels thinner. In the driving-circuit-united-type display apparatuses, a display section in which pixels are arranged in a matrix manner and peripheral driving circuits for driving the display section are mounted on a transparent, insulating substrate as a unit. In liquid-crystal display apparatuses and EL display apparatuses, since thin-film transistors (TFT) are used as pixel transistors, the peripheral driving circuits are also formed by using TFTs when the peripheral driving circuits are mounted on a transparent, insulating substrate.

The peripheral driving circuits of the display apparatuses include a vertical driving circuit for selecting pixels in the display section in units of lines and a horizontal driving circuit for writing display data into each pixel in the selected line. In addition, a data processing circuit for applying various processes to display data to be sent to the horizontal driving circuit needs to be included. It is assumed here that the data processing circuit is formed by using TFTs on a transparent, insulating substrate, such as a glass substrate, in a display apparatus.

TFTs have much variance in element characteristics and the absolute values of their thresholds Vth are large. When TFTs are formed on an insulating substrate, such as a glass substrate, it is known that their element characteristics become worse than when TFTs are formed on a silicon substrate. Therefore, when a data processing circuit is formed on an insulating substrate by using TFTs, where the absolute values of the thresholds Vth are large, it is difficult to process at a high speed, data signals having high data rates, such as digital display data signals.

Even when the absolute values of the thresholds Vth are large, if the power-supply voltage of the circuit is set high and the data signals are handled as large-amplitude signals, it is possible to handle digital data signals having high data rates at a high speed. When the power-supply voltage of the data processing circuit is set high, however, the power consumption of the data processing circuit increases very much. Therefore, it is disadvantageous when the display apparatus has a driving-circuit-united-type structure to reduce its power consumption.

The present invention has been made in consideration of the above issues. An object of the present invention is to provide a data processing circuit capable of processing digital data signals at a high speed with a low power consumption even if the data processing circuit is formed on an insulating substrate by using TFTs, a display apparatus which uses the data processing circuit as one of peripheral driving circuits for a display section, and a portable terminal in which the display apparatus is mounted as an image display section.

DISCLOSURE OF INVENTION

A data processing circuit according to the present invention includes first level-conversion means for level-converting a data signal having a first voltage amplitude input in series to a data signal having a second voltage amplitude larger than the first voltage amplitude, serial-parallel conversion means for converting the data signal level-converted by the first level-conversion means to parallel data signals, and second level-conversion means for level-converting the parallel data signals to data signals having a third voltage amplitude smaller than the second voltage amplitude, and the data processing circuit is formed on an insulating substrate by using thin-film transistors. This data processing circuit is used as a data processing circuit for processing a display data signal input in series from the outside of the substrate and for sending to a plurality of horizontal driving circuits, in a display apparatus in which the data processing circuit is mounted on the same transparent, insulating substrate as a display section is mounted. A display apparatus using the data processing circuit is mounted as a screen display section on portable terminals typical of which are PDAs (personal digital assistants) and portable telephones.

In the data processing circuit having the above-described structure, a display apparatus using the data processing circuit as one of peripheral driving circuits for a display section, or a portable terminal on which the display apparatus is mounted as a screen display section, a data signal having a first voltage amplitude input in series is level-converted by the first level converting means to a data signal having a second voltage amplitude, which is a data signal having a large amplitude. Even if the serial data signal has a high data rate, since it has a large amplitude, the serial-parallel conversion means can apply high-speed processing, and converts the serial data signal to parallel data signals at a high speed. With this parallelization processing, the data rate of the data signal is lowered. The parallel data signals are level-converted by the second level-conversion means to data signals having a third voltage amplitude, which are data signals having a small amplitude. Since the data signals have a low data rate even through the signals are small-amplitude signals, high-speed processing is allowed even when the power-supply voltage is low in subsequent stages.

BEST MODE FOR CARRYING OUT THE INVENTION

Embodiments of the present invention will be described below in detail by referring to the drawings.

Figure 1:
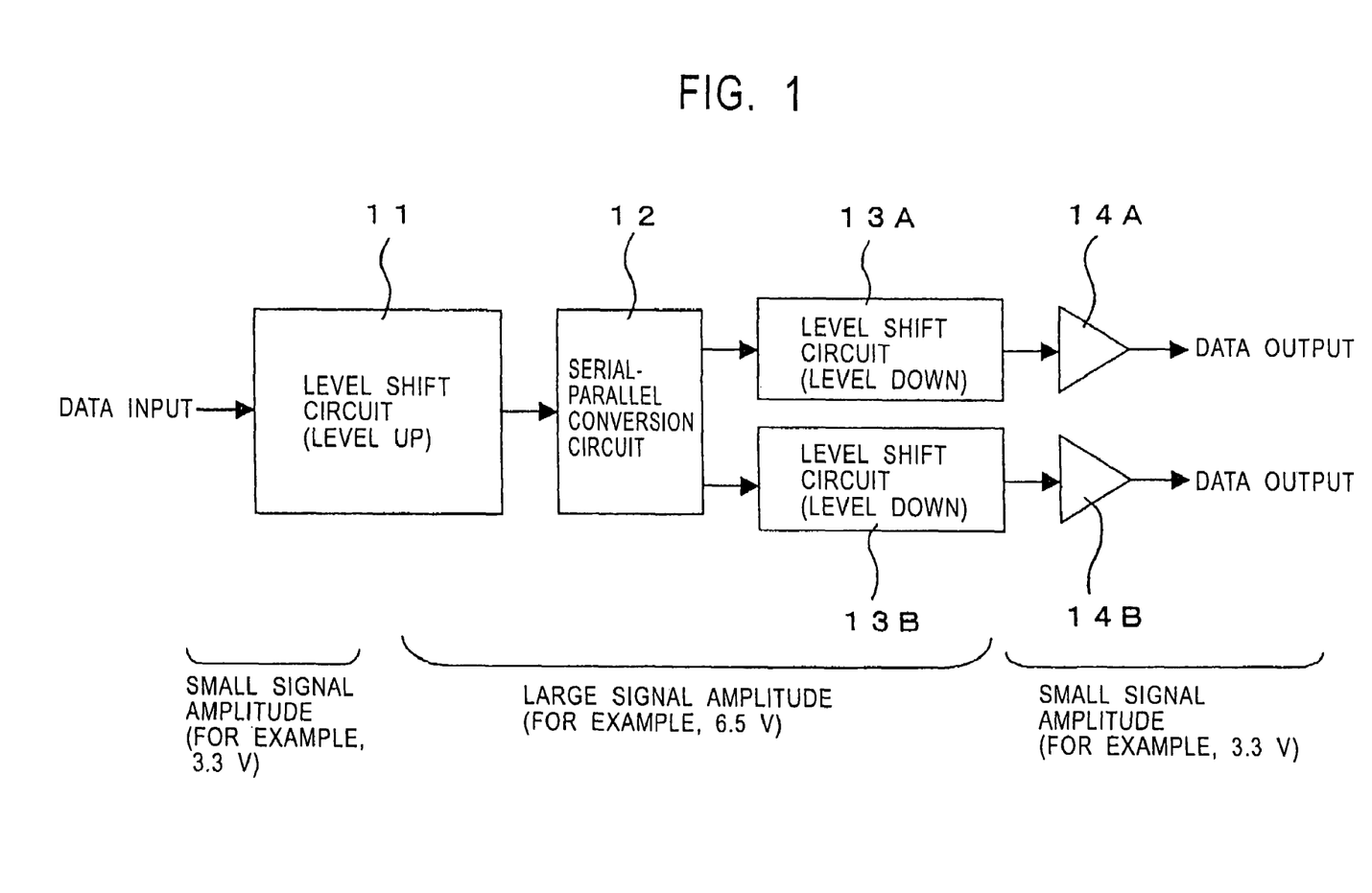
FIG. 1 is a block diagram showing an example structure of a data processing circuit according to an embodiment of the present invention.

FIG. 1 is a block diagram showing an example structure of a data processing circuit according to an embodiment of the present invention. As clear from FIG. 1, the data processing circuit according to the present embodiment has a level shift circuit 11 serving as first level-conversion means, a serial-parallel conversion circuit 12, level shift circuits 13A and 13B serving as second level-conversion means, and output circuits 14A and 14B. It is assumed that the data processing circuit is formed on an insulating substrate, such as a glass substrate, by using TFTs, which have much variance in element characteristics and much variance in thresholds Vth.

A digital data signal having a first voltage amplitude (for example, 0 V to 3.3 V) is input in series to the data processing circuit according to the present embodiment. The level shift circuit 11 level-converts (increases in level) the data signal having the first voltage amplitude input in series to a data signal having a second voltage amplitude (for example, 0 V to 6.5 V) larger than the first voltage amplitude. The serial-parallel conversion circuit 12 converts the serial data signal increased in level by the level shift circuit 11 to, for example, two parallel data signals. Serial-parallel conversion here means processing in which a digital data signal input in series is converted to a plurality of, in the present embodiment, two, digital data signals (two parallel data signals).

At a subsequent stage of the serial-parallel conversion circuit 12, the two level-conversion circuits 13A and 13B serving as third level-conversion means are provided, for the two digital data signals. The two level-conversion circuits level-convert (reduce in level) the data signals having the second voltage amplitude to data signals having a third voltage amplitude (for example, 0 V to 3.3 V) smaller than the second voltage amplitude. The digital data signals having the third voltage amplitude are output to the outside through the output circuits 14A and 14B.

In the data processing circuit according to the present embodiment having the above structure, the data signal having the first voltage amplitude, input in series is increased in level to the data signal having the second voltage amplitude by the level shift circuit 11, and sent as a data signal having a large amplitude to the serial-parallel conversion circuit 12. Since the serial data signal has a large amplitude even if it has a high data rate, the serial-parallel conversion circuit 12 can apply high-speed processing even when it is structured by using TFTs, to convert the serial data signal to a parallel data signal at a high speed.

The data rate of the data signal is lowered by the serial-parallel conversion performed in the serial-parallel conversion circuit 12. Since the data signal is converted to two parallel data signals in the present example circuit, the data rate of the data signal after the conversion is half the data rate used before the conversion. The parallel data signals are reduced in level by the level shift circuits 13A and 13B to the data signals having the third voltage amplitude, which is signals having a small amplitude. The signals having the small amplitude are output to the outside through the output circuits 14A and 14B. Since the data signals have a low data rate even when they have a small amplitude, the output circuits 14A and 14B and outside circuits can process them even if they have a low power-supply voltage and are structured by using TFTs.

Since just a part of a section, which includes the output stage of the level shift circuit 11, the serial-parallel conversion circuit 12, and the level shift circuits 13A and 13B, handles data signals having large amplitudes in the section which, as described above, increases in level a data signal having a small voltage amplitude input in series to a signal having a large voltage amplitude, converts the serial data signal having the large voltage amplitude to parallel data signals, and then, reduces in level to data signals having a small voltage amplitude, even when the section is a data processing circuit structured by forming TFTs on an insulating substrate, high-speed processing can be applied to digital data signals at a low power consumption.

Figure 2:
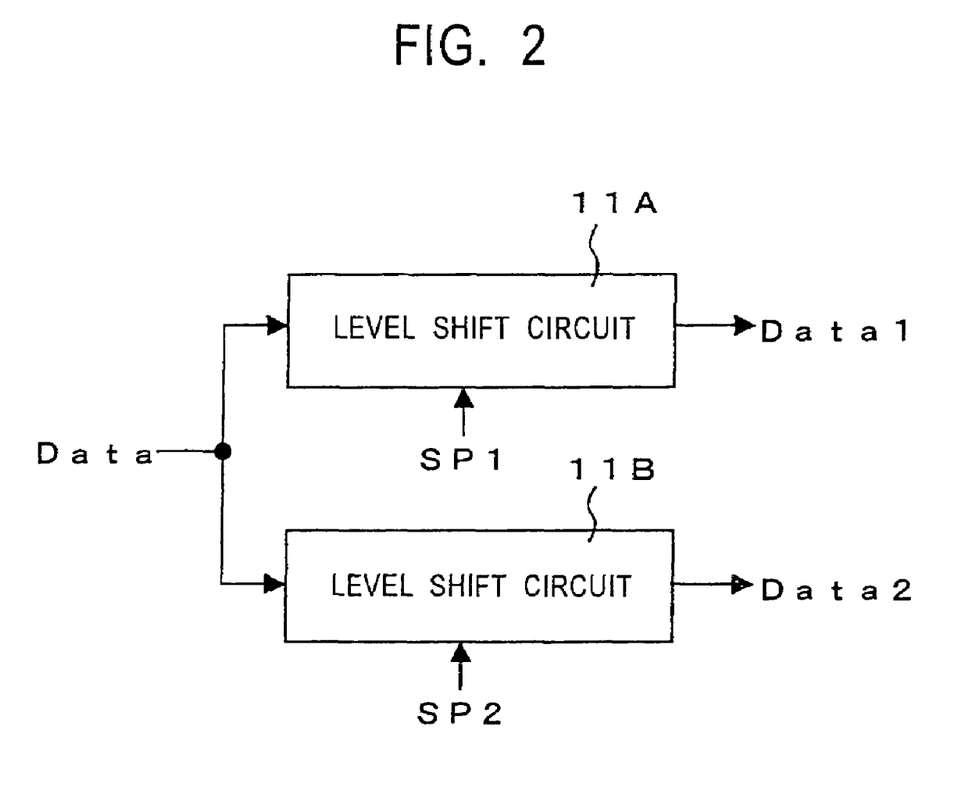
FIG. 2 is a block diagram showing an example specific structure of a level shift circuit and a serial-parallel conversion circuit.

In the data processing circuit according to the present embodiment having the above-described structure, the level shift circuit 11 and the serial-parallel conversion circuit 12 are, for example, structured as a single circuit. More specifically, when a data signal input in series is converted to two parallel data signals, two sample-and-latch level shift circuits 11A and 11B are disposed in parallel as shown in FIG. 2, and input data Data is input to both of the level shift circuits 11A and 11B.

Two sampling pulses SP1 and SP2 having different phases are given to the level shift circuits 11A and 11B, respectively, such that the level shift circuits 11A and 11B perform sampling at different timing. With these operations, the level shift circuits 11A and 11B increase in level the data signal Data, and then, output two parallel data signals Data 1 and Data 2, respectively, which are separated.

Figure 3:
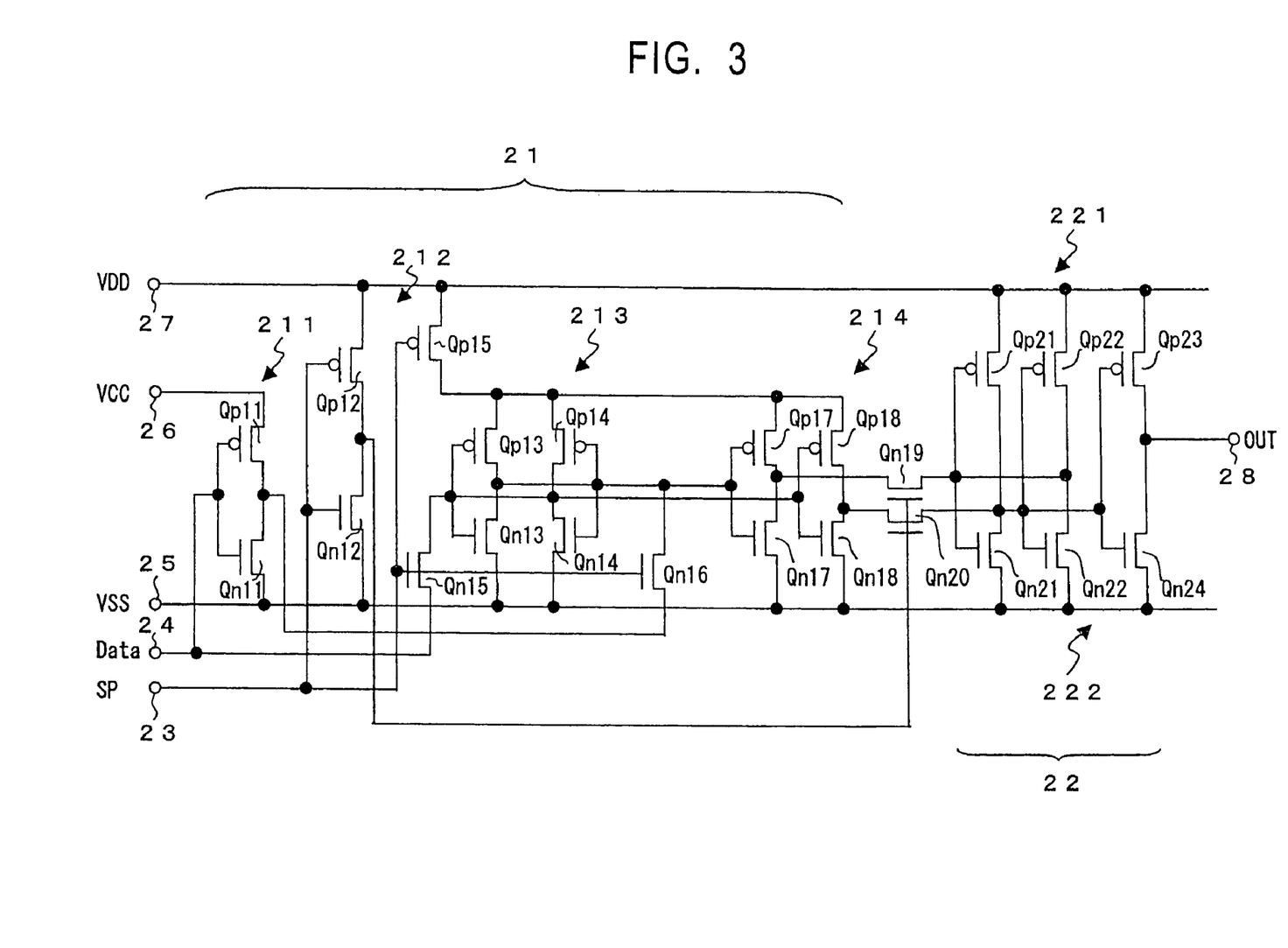
FIG. 3 is a circuit diagram showing a specific circuit example of a sample-and-latch level shift circuit which also functions as a serial-parallel conversion circuit.

FIG. 3 is a circuit diagram showing an example specific circuit of the sample-and-latch level shift circuits 11A and 11B which also serve as the serial-parallel conversion circuit 12. As clear from FIG. 3, the sample-and-latch level shift circuit 11A (11B) according to the present embodiment has a sample-and-latch section 21 and a data latch section 22 both of which are formed on an insulating substrate by using TFTs.

The level shift circuit has a control terminal 23, a data input terminal 24, a negative power-supply terminal 25, two positive power-supply terminals 26 and 27, and a data output terminal 28. A sampling pulse SP is input to the control terminal 23 from the outside of the substrate. The data signal Data having the first voltage amplitude (0 V to 3.3 V) is input to the data input terminal 24 from the outside of the substrate. A power-supply voltage VSS (for example, the ground level) is given to the power-supply terminal 25. A power-supply voltage VCC (3.3 V in this case) corresponding to the amplitude voltage of the data signal Data is given to the power-supply terminal 26. A power-supply voltage VDD (6.5 V in this case) higher than the power-supply voltage VCC is given to the power-supply terminal 27.

The sample-and-latch section 21 is formed of CMOS inverters 211 and 212, a CMOS latch cell 213, and an inverter circuit 214. The CMOS inverter 211 is connected in series between, for example, a VCC line and a VSS line, and is formed of a PMOS transistor Qp11 and an NMOS transistor Qn11 of which the gates are connected to the data input terminal 24. The CMOS inverter 211 inverts the polarity of the data signal Data input to the data input terminal 24 from the outside of the substrate.

The CMOS inverter 212 is connected in series between, a VDD line and the VSS line, and is formed of a PMOS transistor Qp12 and an NMOS transistor Qn12 of which the gates are connected in common. The CMOS inverter 212 inverts the polarity of the sampling pulse SP having an amplitude of 0 V to 6.5 V, input through the control terminal 21.

The CMOS latch cell 213 has a first CMOS inverter formed of a PMOS transistor Qp13 and an NMOS transistor Qn13 which are connected in series and of which the gates are connected in common, and a second CMOS inverter formed of a PMOS transistor Qp14 and an NMOS transistor Qn14 which are connected in series and of which the gates are connected in common, and the input and output ends of these CMOS inverters are cross-connected.

More specifically, the input end of the first CMOS inverter, that is, the common gate connection point of the MOS transistors Qp13 and Qn13, is connected to the output end of the second CMOS inverter, that is, the common drain connection point of the MOS transistors Qp14 and Qn14, and the input end of the second CMOS inverter, that is, the common gate connection point of the MOS transistors Qp14 and Qn14, is connected to the output end of the first CMOS inverter, that is, the common drain connection point of the MOS transistors Qp13 and Qn13.

A PMOS transistor Qp15 is connected between the VDD line and the power-supply side of the CMOS latch cell 213. The PMOS transistor Qp15 is on while the sampling pulse SP input through the control terminal 21 is at a low level, and supplies the power-supply voltage VDD to the CMOS latch cell 213. The PMOS transistor Qp15 is off while the sampling pulse SP is at a high level, and interrupts the supply of the power-supply voltage VDD to the CMOS latch cell 213. With this, the CMOS latch cell 213 functions as a level shift section.

In the CMOS latch cell 213, an NMOS transistor Qn15 is connected between the input end of the first CMOS inverter and the data input terminal 24, and an NMOS transistor Qn16 is connected between the input end of the second CMOS inverter and the output end of the CMOS inverter 211. The NMOS transistors Qn15 and Qn16 are on while the sampling pulse SP is at the high level, sample the data signal Data and a signal having its reverse phase, and output to the CMOS latch cell 213.

The inverter circuit 214 has a first CMOS inverter formed of a PMOS transistor Qp17 and an NMOS transistor Qn17 which are connected in series and of which the gates are connected in common, and a second CMOS inverter formed of a PMOS transistor Qp18 and an NMOS transistor Qn18 which are connected in series and of which the gates are connected in common, and is in an operation state when the power-supply voltage VDD is supplied through the PMOS transistor Qp15.

In this inverter circuit 214, the input ends of the first and second CMOS inverters, that is, the common gate connection points of the MOS transistors Qp17 and Qn17, and Qp18 and Qn18, are connected to the output ends of the first and second CMOS inverters of the CMOS latch cells 213, respectively. The output ends of the first and second CMOS inverters, that is, the common drain connection points of the MOS transistors Qp17 and Qn17, and Qp18 and Qn18, are connected to the drains of NMOS transistors Qn19 and Qn20, respectively. The NMOS transistors Qn19 and Qn20 is on when the sampling pulse SP level-shifted by the CMOS inverter 212 is in a high-level state, and the data signal Data latched by the CMOS latch cell 213 is sent to the data latch section 22 in the next stage.

The data latch section 22 is formed of a CMOS latch 221 and a CMOS inverter 222. The CMOS latch 221 has a first CMOS inverter formed of a PMOS transistor Qp21 and an NMOS transistor Qn21 which ate connected in series between the VDD line and the VSS line and of which the gates are connected in common, and a second CMOS inverter formed of a PMOS transistor Qp22 and an NMOS transistor Qn22 which are connected in series between the VDD line and the VSS line and of which the gates are connected in common, and the input and output ends of these CMOS inverters are cross-connected.

More specifically, the input end of the first CMOS inverter, that is, the common gate connection point of the MOS transistors Qp21 and Qn21, is connected to the output end of the second CMOS inverter, that is, the common drain connection point of the MOS transistors Qp22 and Qn22, and the input end of the second CMOS inverter, that is, the common gate connection point of the MOS transistors Qp22 and Qn22, is connected to the output end of the first CMOS inverter, that is, the common drain connection point of the MOS transistors Qp21 and Qn21. The input ends of the first and second CMOS inverters are connected to the sources of the NMOS transistors Qn19 and Qn20 of the sample-and-latch section 21.

The CMOS inverter 222 is formed of a PMOS transistor Qp23 and an NMOS transistor Qn23 which are connected in series between the VDD line and the VSS line and of which the gates are connected in common. The input end of the CMOS inverter 222, that is, the common gate connection point of the MOS transistors Qp23 and Qn23, is connected to the output end of the first CMOS inverter of the CMOS latch 221, and the output end of the CMOS inverter 222, that is, the common drain connection point of the MOS transistors Qp23 and Qn23, is connected to the data output terminal 28.

The sample-and-latch level shift circuits having the above-described structure are disposed in parallel as shown in FIG. 2. The input data Data is input in common to these level shift circuits 11A and 11B, and the two sampling pulses SP1 and SP2 having different phases are given to the level shift circuits 11A and 11B, respectively, to make the level shift circuits 11A and 11B sample and latch the data at different timing. With this, Level conversion (level up) and serial-parallel conversion are effectively applied to the data signal Data input in series.

The sample-and-latch level shift circuit shown in FIG. 3 performs level conversion at the moment when the sampling pulse SP rises, and current flows only this moment. Therefore, a low power consumption is implemented. In addition, since this sample-and-latch level shift circuit functions as both the level shift circuit 11 and the serial-parallel conversion circuit 12, the required space is reduced, which is an advantage.

In the above-described embodiment, the case in which the third voltage amplitude to which the level shift circuits 13A and 13B reduce the signal level is set to the small voltage amplitude (0 V to 3.3 V in the embodiment) of the input data signal has been described as an example. The third voltage amplitude is not limited to this voltage amplitude. When the third voltage amplitude is set to any voltage amplitude smaller than the second voltage amplitude, the effect of reducing power consumption is obtained. When the third voltage amplitude is set to the small voltage amplitude of the input data signal, however, another power supply is not required, which is an advantage.

In the above-described embodiment, the data signal input in series is separated into two data signals, that is, is converted to two parallel data signals, in the serial-parallel conversion circuit 12. The input data signal may be converted to three or more parallel data signals to further reduce the data rate of the data signals. More specifically, the circuit shown in FIG. 2 needs to be configured such that n (n≧3) level shift circuits are disposed in parallel, and n sampling pulses SP1 to SPn having different phases are sent to these n level shift circuits, respectively.

The usage of the data processing circuit according to the present embodiment, described above, is not specifically limited. It is suited, for example, to a peripheral driving circuit for driving a display section in a driving-circuit-united display apparatus. The present invention is not limitedly applied to driving circuits for display apparatuses. The present invention is also useful when it is applied to a single data processing circuit formed on an insulating substrate by using TFTs.

Figure 4:
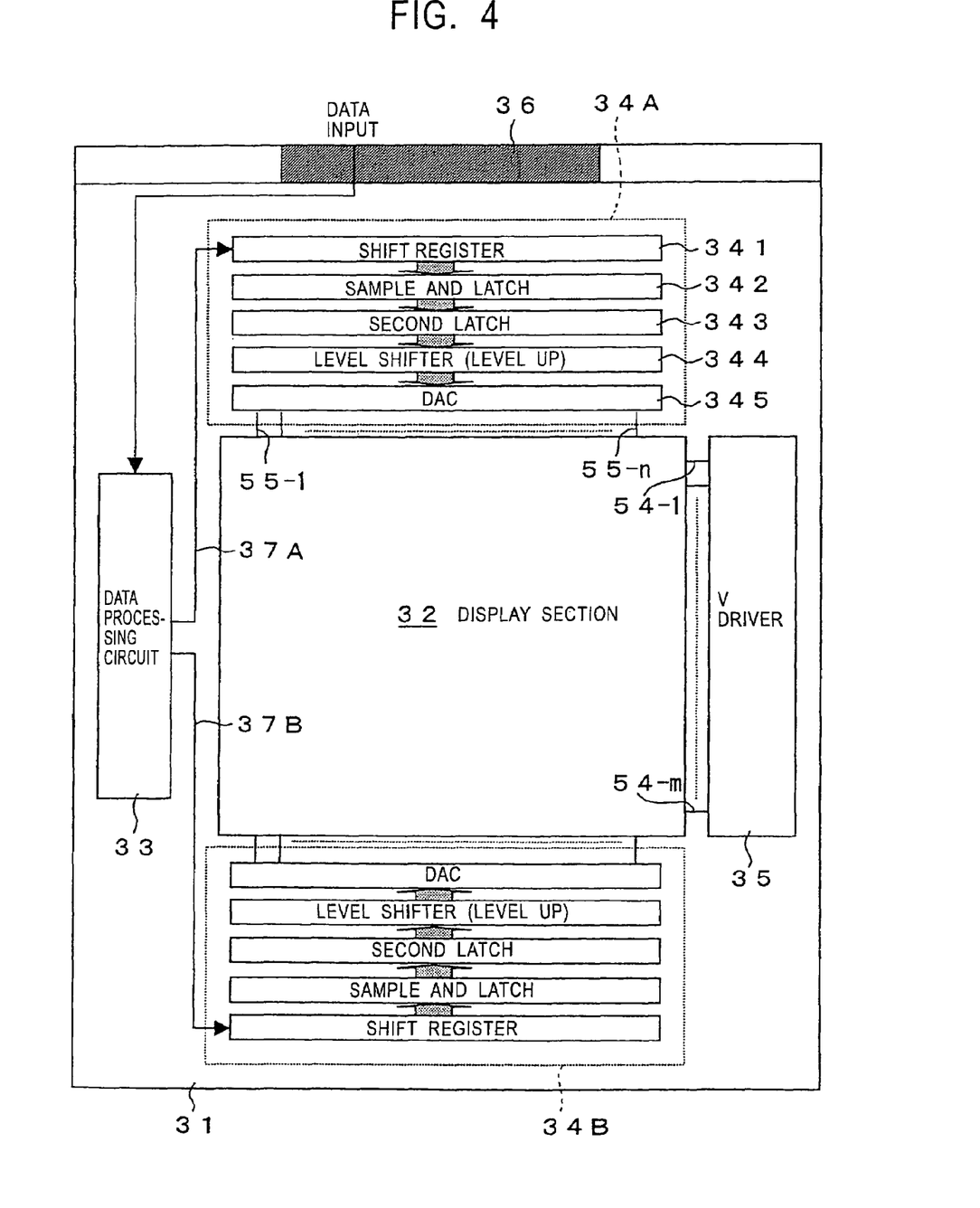
FIG. 4 is a block diagram showing an example structure of a driving-circuit-united-type liquid-crystal display apparatus according to the present invention.

FIG. 4 is a block diagram showing an example structure of a driving-circuit-united-type display apparatus according to the present invention, such as a liquid crystal display apparatus. In FIG. 4, a display section (pixel section) 32 in which pixels are disposed in a matrix manner is formed on a transparent, insulating substrate, such as a glass substrate 31. The glass substrate 31 is disposed opposite another glass substrate with a predetermined gap arranged therebetween, and a liquid-crystal material is sealed between the substrates to form a display panel (LCD panel).

Figure 5:
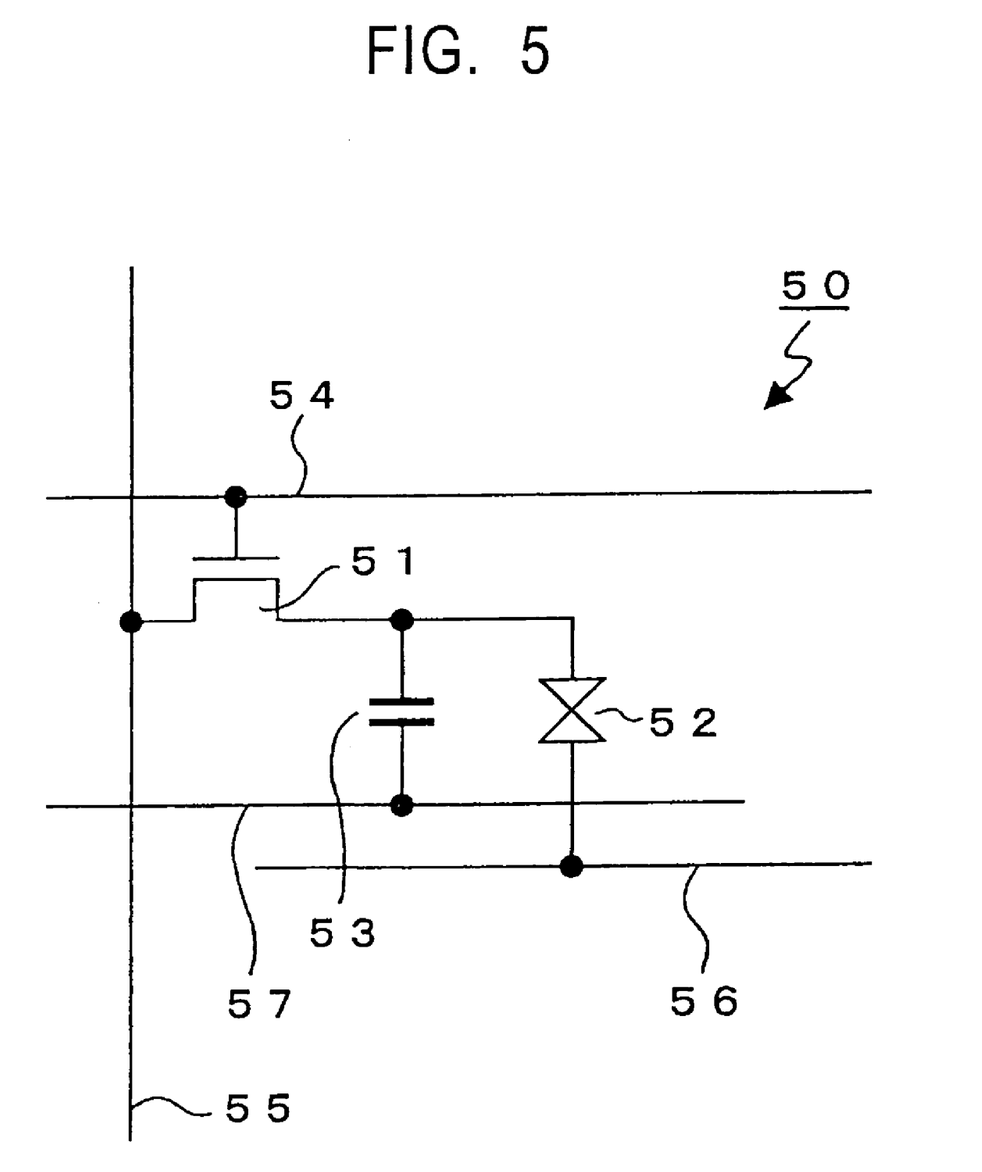
FIG. 5 is a circuit diagram showing an example structure of a pixel in a display section.

FIG. 5 shows an example structure of each pixel in the display section 32. Each of the pixels 50 disposed in a matrix manner has a TFT (thin film transistor) 51 serving as a pixel transistor, a liquid-crystal cell 52 of which a pixel electrode is connected to the drain electrode of the TFT 51, and a holding capacitor 53 of which one electrode is connected to the drain electrode of the TFT 51. The liquid-crystal cell 52 here means a liquid-crystal capacitor generated between the pixel electrode and an opposing electrode formed opposite the pixel electrode.

In this pixel structure, the gate electrode of the TFT 51 is connected to a gate line (scanning line) 54, and the source electrode thereof is connected to a data line (signal line) 55. The opposing electrode of the liquid-crystal cell 52 is connected to a VCOM line 56 in every pixel. A common voltage VCOM (VCOM potential) is given to the opposing electrode of the liquid-crystal cell 52 through the VCOM line 56 in every pixel. The other electrode (terminal at the opposing electrode side) of the holding capacitor 53 is connected to a CS line 57 in every pixel.

When 1H (H: horizontal period) inversion driving or 1F (F: field period) inversion driving is performed, a display signal to be written into each pixel is inverted in polarity with the VCOM potential used as a reference. When VCOM inversion driving in which the polarity of the VCOM potential is inverted at an 1H interval or 1F interval is used together with 1H inversion driving or 1F inversion driving, the polarity of a CS potential given to the CS line 57 is also alternately inverted in synchronization with the VCOM potential.

An alternating voltage having almost the same amplitude as the CS potential is used as the VCOM potential. Since a voltage drop occurs at the TFT 51 due to a parasitic capacitor when a signal is written into the pixel electrode of the liquid-crystal cell 52 from the data line 54 through the TFT 51, the alternating voltage obtained by adding the voltage drop to almost the same amplitude as the CS potential is actually used as the VCOM potential.

Back to FIG. 4, on the glass substrate 31 where the display section 32 is disposed, as peripheral driving circuits, for example, a data processing circuit 33 is mounted at the left-hand side of the display section 32, horizontal (H) drivers (horizontal driving circuits) 34A and 34B are mounted at the upper and lower sides of the display section 32, and a vertical (V) driver (vertical driving circuit) 35 is mounted at the right-hand side of the display section 32. Only a part of peripheral driving circuits is shown in the figure. The peripheral driving circuits are not limited to those shown in the figure. The horizontal drivers 34A and 34B may be disposed at either side, the upper or lower side, of the display section 32. These peripheral driving circuits are manufactured by using low-temperature poly-silicon or CG (continuous grain) silicon together with the pixel transistors of the display section 32.

In the liquid-crystal display apparatus having the above-described structure, R (red), G (green), and B (blue) parallel-input display data having a small voltage amplitude (for example, an amplitude of 0 V to 3.3 V) is input to the glass substrate 31 through an input pad (PAD) section 36 from the outside of the substrate. The input digital display data is separated into a plurality of data items, in this case, into two data items, one written into odd-numbered pixels in the display section 32 and the other written into even-numbered pixels. The two separated digital data items are sent to the horizontal drivers 34A and 34B through data bus lines 37A and 37B.

The horizontal driver 34A has a digital driver structure in which, for example, a horizontal shift register 341, a data sample-and-latch section 342, a second latch section 343, a level shifter 344, and a DA. (digital-to-analog) conversion circuit (DAC) 344 are provided. The horizontal driver 34B has exactly the same structure as the horizontal driver 34A. As an example, the horizontal driver 34A writes display data into odd-numbered pixels in the display section 32, and the horizontal driver 34B writes display data into even-numbered pixels in the display section 32.

The horizontal shift register 341 starts a shift operation in response to a horizontal start pulse HST sent from a timing generation circuit (not shown), and generates sampling pulses to be sequentially sent in one horizontal period in synchronization with horizontal clock pulses HCK sent from the timing generation circuit. The data sample-and-latch section 342 sequentially samples and latches in one horizontal period, display data Data sent from the data processing circuit 33 in synchronization with the sampling pulses generated by the horizontal shift register 341.

One-line latched digital data is collectively sent to the second latch section 343 in a horizontal blanking period. The second latch section 343 collectively outputs the one-line digital data. The output one-line digital data is increased in level by the level shifter 344, sent to the DA conversion circuit 345, and converted into an analog display signal. The one-line analog display signal is output from the DA conversion circuit 345 to data lines 55-1 to 55-n arranged correspondingly to the number of pixels in the horizontal direction in the display section 32.

The vertical driver 35 is formed of a vertical shift register and a gate buffer. In the vertical driver 35, the vertical shift register starts a shift operation in response to a vertical start pulse VST sent from a timing generation circuit (not shown), and generates scanning pulses to be sequentially sent in one vertical period in synchronization with vertical clock pulses VCK sent from the timing generation circuit. The generated scanning pulses are sequentially output through the gate buffer to gate lines 54-1 to 54-m arranged correspondingly to the number of pixels in the vertical direction in the display section 32.

When the scanning pulses are sequentially output to the gate lines 54-1 to 54-m by vertical scanning performed by the vertical driver 35, pixels are sequentially selected in units of rows (lines) in the display section 32. A one-line analog display signal output from the DA conversion circuit 345 is collectively written into selected one-line pixels through the data lines 55-1 to 55-n. This line writing operation is repeated to display a one-screen image.

In the liquid-crystal display apparatus having the above-described structure, on the panel (glass substrate 31) where the display section 32 is disposed, peripheral driving circuits, such as the data processing circuit 33, the horizontal drivers 34A and 34B, and the vertical driver 35 are integratedly mounted. Therefore, an all-driving-circuit-united-type display panel is structured. In addition, since there is no need to provide externally another substrate, an IC, or a transistor circuit, the entire system can be made compact at a reduced cost.

In the driving-circuit-united-type liquid-crystal display apparatus, the data processing circuit according to the embodiment described before is used as the data processing circuit 33. In this case, when it is assumed that digital display data having a total of 18 bits, six bits for each of R, G, and B, is input from the outside of the substrate, for example, the data processing circuit shown in FIG. 1 is provided for each bit. And, the 18-bit digital display data is separated into two data items. The two digital display data items are sent to the horizontal drivers 34A and 34B through the data bus lines 37A and 37B each having 18 wiring lines.

When the data processing circuit according to the embodiment described before is used as the data processing circuit 33 in this way, even if the data processing circuit is formed on an insulating substrate by using TFTs, display-data high-speed processing is allowed by reducing the data rate of the display data, and a lower power can be consumed by performing signal processing with signals having small voltage amplitudes in circuits where signals having large voltage amplitudes are not required. Therefore, a driving-circuit-united-type circuit-united-type liquid-crystal display apparatus can be implemented by using TFTs, which was conventionally considered difficult, and RGB parallel-input digital display data can be processed at a high speed at a low power consumption.

When a driving-circuit-united-type liquid-crystal display apparatus is structured, since the position of the data processing circuit 33 is limited on the substrate, the data bus lines 37A and 37B through which digital display data is sent from the data processing circuit 33 to the horizontal drivers 34A and 34B need to have long wiring lines. Therefore, parasitic capacitors attached to the wiring lines have large capacitance, and the load of the capacitors is heavy. In addition, since the data bus lines each have 18 wiring lines to handle digital display data having 18 bits, six bits for each of R, G, and B, the load of their capacitors become very heavy.

The data processing circuit 33 needs to drive this very heavy load of capacitors. Therefore, the data processing circuit 33 consumes very much electric power. When the data processing circuit according to the embodiment described before is used as the data processing circuit 33, since the data signals having the large voltage amplitude are reduced in level by the level shift circuits 13A and 13B to the data signals having the small voltage amplitude in FIG. 1, processing at the output circuits 14A and 14B and subsequent stages need just a little power consumption. This means that the data processing circuit according to the embodiment described before is very suited for sending digital data through the long data bus lines 37A and 37B.

In the present example application, a case in which digital display data is separated into two data items, in other words, display data input in series is converted to two parallel display data items in the processing of the data processing circuit 33 is taken as an example. It is also possible that display data input in series is converted to three or more parallel display data items to further reduce the data rate of the input display data. In this case, the number of horizontal drivers corresponding to the number of parallel data items need to be disposed.

Figure 6:
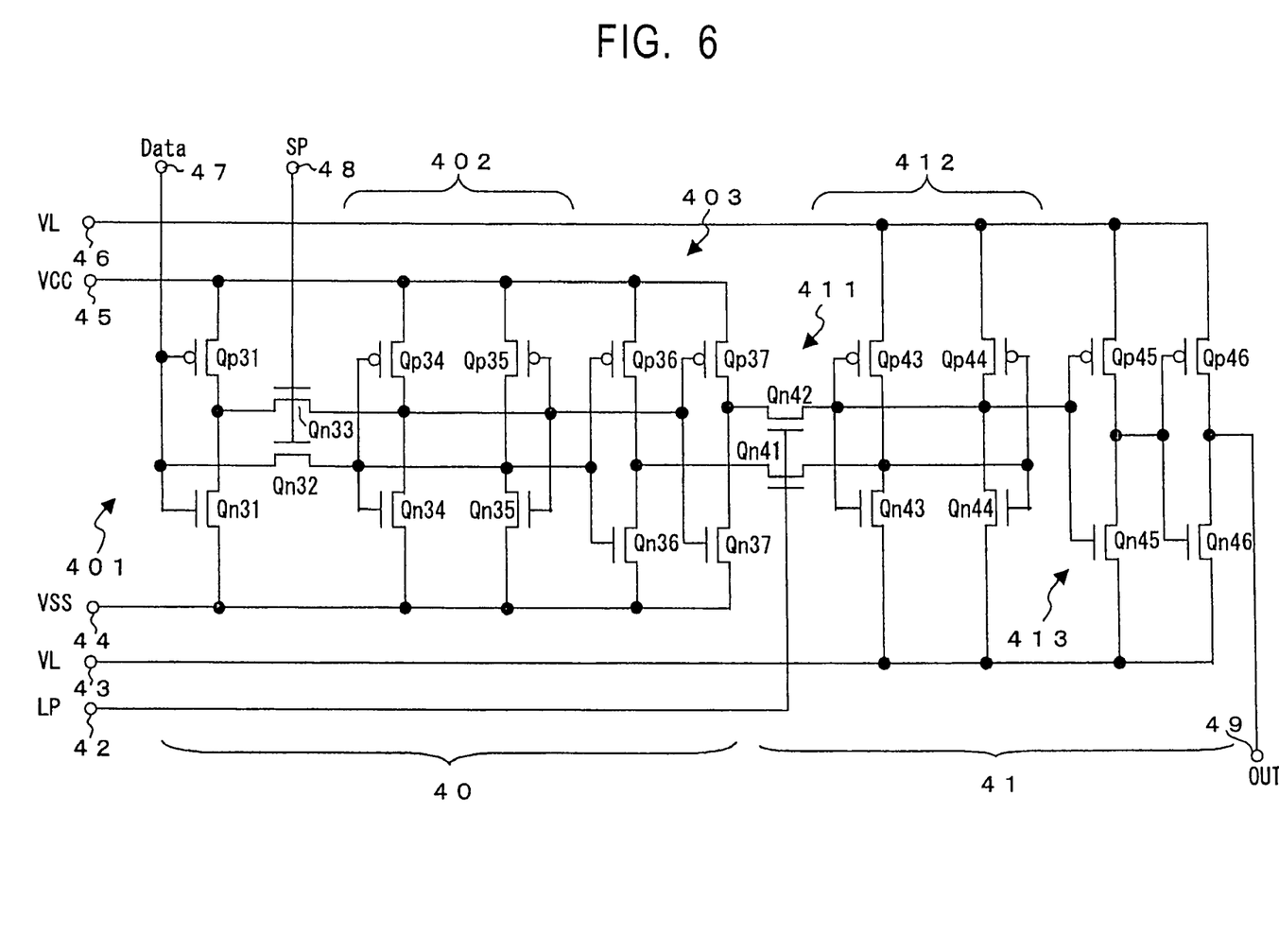
FIG. 6 is a circuit diagram showing an example specific circuit of a data sample-and-latch section, a second latch section, and a level shifter in a horizontal driver.

FIG. 6 is a circuit diagram showing specific example circuits of the data sample-and-latch section 342, the second latch section 343, and the level shifter 344 in the horizontal driver 34A (34B).

As clear from FIG. 6, the circuit according to this case has a sample-and-latch section 40 and a data latch section 41 both of which are formed on an insulating substrate by using TFTs. The data latch section 41 also functions as a level shifter. In other words, in referring to FIG. 4, the sample-and-latch section 40 corresponds to the data sample-and-latch section 342, and the data latch section 41 corresponds to the second latch section 343 and the level shifter 344.

The circuit according to the present case has a first control terminal 42, two negative power-supply terminals 43 and 44, two positive power-supply terminals 45 and 46, a data input terminal 47, a second control terminal 48, and a data output terminal 49. The display data having the small voltage amplitude (0 V to 3.3 V in the present case) sent from the data processing circuit 33 through the data bus lines 37A and 37B in FIG. 4 is input to the data input terminal 47. A latch pulse LP generated by a timing generation circuit (not shown) is input to the control terminal 42. A sampling pulse SP generated by the timing generation circuit is input to the control terminal 48.

Between the power-supply terminal 44 and the power-supply terminal 45, the amplitude voltage of display data input to the data input terminal 47 is given. More specifically, in the present case, 0 V (the ground level) is given as a power-supply voltage VSS, and 3.3 V is given as a power-supply voltage VCC. A power-supply voltage VL lower than the power-supply voltage VSS, for example, −3.3 V, is given to the power-supply terminal 43. A power-supply voltage VDD higher than the power-supply voltage VCC, for example, 6.5 V, is given to the power-supply terminal 46.

The sample-and-latch section 40 is formed of an input section 401, a CMOS latch cell 402, and an output section 403. The input section 401, the CMOS latch cell 213, has a CMOS inverter formed of a PMOS transistor Qp31 and an NMOS transistor Qn31 which are connected in series between the VCC line and the VSS line and of which the gates are connected in common to the data input terminal 47; and sampling NMOS transistors Qn32 and Qn33 of which the gates are connected to the input and output ends of the CMOS inverter, respectively, that is, the common gate connection point and the common drain connection point of the PMOS transistor Qp31 and the NMOS transistor Qn31. The gates of the NMOS transistors Qn32 and Qn33 are connected in common to the control terminal 48.

The CMOS latch cell 402 has a first CMOS inverter formed of a PMOS transistor Qp34 and an NMOS transistor Qn34 which are connected in series between the VCC line and the VSS line and of which the gates are connected in common, and a second CMOS inverter formed of a PMOS transistor Qp35 and an NMOS transistor Qn35 which are connected in series between the VCC line and the VSS line and of which the gates are connected in common, and the input and output ends of these CMOS inverters are cross-connected.

More specifically, the input end of the first CMOS inverter, that is, the common gate connection point of the MOS transistors Qp34 and Qn34, is connected to the output end of the second CMOS inverter, that is, the common drain connection point of the MOS transistors Qp35 and Qn35, and the input end of the second CMOS inverter, that is, the common gate connection point of the MOS transistors Qp35 and Qn35, is connected to the output end of the first CMOS inverter, that is, the common drain connection point of the MOS transistors Qp34 and Qn34. The input ends of the first and second CMOS inverters are connected to the sources of the sampling NMOS transistors Qn32 and Qn33, respectively.

The output section 403 has a first CMOS inverter formed of a PMOS transistor Qp36 and an NMOS transistor Qn36 which are connected in series between the VCC line and the VSS line and of which the gates are connected in common, and a second CMOS inverter formed of a PMOS transistor Qp37 and an NMOS transistor Qn37 which are connected in series between the VCC line and the VSS line and of which the gates are connected in common. The input end of the first CMOS inverter is connected to the common drain connection point of the MOS transistors Qp35 and Qn35 in the CMOS latch cell 402. The input end of the second CMOS inverter is connected to the common gate connection point of the MOS transistors Qp35 and Qn35 in the CMOS latch cell 402.

The data latch section 41 is formed of an input section 411, a CMOS latch cell 412, and an output section 413. The input section 411 has latch NMOS transistors Qn41 and Qn42. The drain of the NMOS transistor Qn41 is connected to the common drain connection point of the MOS transistors Qp36 and Qn36 of the output section 403 of the sample-and-latch section 40. The drain of the NMOS transistor Qn42 is connected to the common drain connection point of the MOS transistors Qp37 and Qn37 of the output section 403. The gates of the NMOS transistors Qn41 and Qn42 are connected in common to the control terminal 42.

The CMOS latch cell 412 has a first CMOS inverter formed of a PMOS transistor Qp43 and an NMOS transistor Qn43 which are connected in series between a VH line and the VL line and of which the gates are connected in common, and a second CMOS inverter formed of a PMOS transistor Qp44 and an NMOS transistor Qn44 which are connected in series between the VH line and the VL line and of which the gates are connected in common, and the input and output ends of these CMOS inverters are cross-connected.

More specifically, the input end of the first CMOS inverter, that is, the common gate connection point of the MOS transistors Qp43 and Qn43, is connected to the output end of the second CMOS inverter, that is, the common drain connection point of the MOS transistors Qp44 and Qn44, and the input end of the second CMOS inverter, that is, the common gate connection point of the MOS transistors Qp44 and Qn44, is connected to the output end of the first CMOS inverter, that is, the common drain connection point of the MOS transistors Qp43 and Qn43. The input ends of the first and second CMOS inverters are connected to the sources of the latch NMOS transistors Qn41 and Qn42, respectively.

The output section 413 has a first CMOS inverter formed of a PMOS transistor Qp45 and an NMOS transistor Qn45 which are connected in series between the VH line and the VL line and of which the gates are connected in common, and a second CMOS inverter formed of a PMOS transistor Qp46 and an NMOS transistor Qn46 which are connected in series between the VH line and the VL line and of which the gates are connected in common, and the CMOS inverters are connected in cascade. The input end of the first CMOS inverter is connected to the output end of the CMOS latch cell 412.

In the circuit having the above-described structure, that is, the circuit having the functions of the data sample-and-latch section 342, the second latch section 343, and the level shifter 344 in the horizontal driver 34A (34B), until data is sent to the data latch section 41 corresponding to the second latch section 343, in other words, in the sample-and-latch section 40, processing is performed at a power-supply voltage of 0 V to 3.3 V which corresponds to the voltage amplitude (0 V to 3.3 V) of display data sent from the data processing circuit 33. As a result, power consumption is suppressed.

The power-supply voltages VH and VL are switched on after data transmission to the data latch section 41 is completed, and the data latch section 41 performs processing at the power-supply voltages VH and VL, display data is shifted in level in the data latch section 41, that is, a small voltage amplitude (VSS to VCC) is increased in level to a large voltage amplitude (VL to VH). Since the data latch section 41, corresponding to the second latch section 343, also functions as the level shifter 344 in this way, the circuit structure is simplified and the required space is reduced.

In the example application described above, a case in which the present invention is applied to a liquid-crystal display apparatus using liquid-crystal cells as display elements is taken as an example. Applications are not limited to this example application. The present invention can be applied to general display apparatuses in which a data processing circuit is mounted to the same substrate as a display section is mounted to, such as EL display apparatuses using EL (electroluminescence) elements as display elements.

Display apparatuses typical of which are liquid-crystal display apparatuses according to the above-described example application are suitable for the use as screen display sections in compact and lightweight portable terminals typical of which are portable telephones and PDAs (personal digital assistants).

Figure 7:
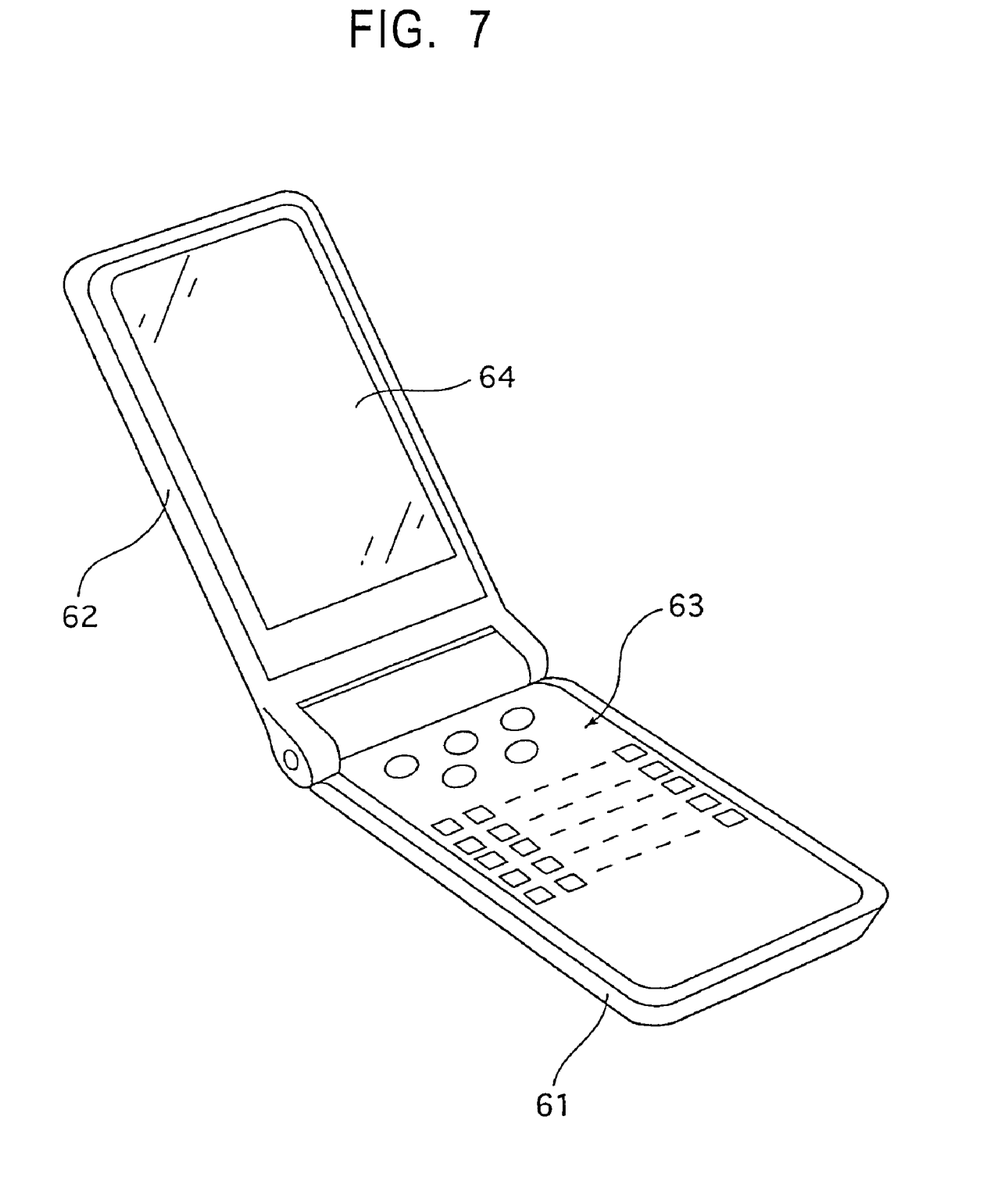
FIG. 7 is an appearance view showing an outlined structure of a PDA according to the present invention.

FIG. 7 is an appearance view showing an outlined structure of a PDA, which is an example of a portable terminal according to the present invention.

The PDA according to this case has, for example, a folding structure in which a cover 62 is provided for an apparatus body 61 so as to be made open or closed freely. On the upper surface of the apparatus body 61, an operation section 63 in which various types of keys, such as those in a keyboard, are arranged is provided. The cover 62 is provided with a screen display section 64. As the screen display section 64, a liquid-crystal display apparatus in which the data processing circuit according to the embodiment described above is mounted on the same substrate as a display section is mounted is used.

As described before, a liquid-crystal display apparatus to which the data processing circuit according to the embodiment is mounted can easily implement a driving-circuit-united-type display apparatus using TFTs, and in addition, digital display data can be processed at a high speed with a low power consumption. Therefore, when the liquid-crystal display apparatus is mounted as the screen display section 64, the structure of the entire PDA can be simplified. Further, since the power consumption of the screen display section 64 is lowered, the continuous usable time of the PDA with the use of a battery power supply is extended.

A case in which the present invention is applied to a PDA has been described as an example. The applications of the present invention are not limited to this example application. A liquid-crystal display apparatus according to the present invention is suited especially for general portable terminals which are compact and lightweight, such as portable telephones.

INDUSTRIAL APPLICABILITY

As described above, according to the present invention, a data signal having a small voltage amplitude input in series is increased in level to a data signal having a large voltage amplitude, the serial data signal having the large voltage amplitude is converted to parallel data signals, and then, the parallel data signals are reduced in level to data signals having a small voltage amplitude. Since just a part of a circuit section handles data signals having large amplitudes, even when the section is a data processing circuit structured formed on an insulating substrate by using TFTs, high-speed processing can be applied to digital data signals at a low power consumption.

The invention claimed is:

1. A method of manufacturing a display apparatus comprising:
   providing a display section formed of pixels disposed in a matrix on a transparent, insulating substrate;
   providing a plurality of horizontal driving circuits mounted on the substrate for writing display data into the pixels in the display section; and
   providing a data processing circuit mounted on the substrate for processing a display data signal having a first voltage amplitude input in series and which outputs processed display data to the plurality of horizontal driving circuits,
   wherein the data processing circuit comprises:
   first level-conversion means for level-converting the display data signal having the first voltage amplitude to a display data signal having a second voltage amplitude larger than the first voltage amplitude;
   serial-parallel conversion means for converting the display data signal level-converted by the first level-conversion means to parallel display data signals; and
   second level-conversion means for level-converting the parallel display data signals to display data signals having a third voltage amplitude smaller than the second voltage amplitude.

2. The method of manufacturing a display apparatus according to claim 1, characterized in that
   the plurality of horizontal driving circuits are operated at the third voltage and comprise a data latch circuit group for latching the display data signals sent from the data processing circuit.

3. The method of manufacturing a display apparatus according to claim 2, characterized in that
   the plurality of horizontal driving circuits are operated at the third voltage, and comprise a second latch circuit group for latching display data signals collectively sent from the data latch circuit group, and a level shift circuit group for level-converting the display data signals latched by the second latch circuit group to display data signals having a fourth voltage amplitude larger than the third voltage amplitude.

4. The method of manufacturing a display apparatus according to claim 3, characterized in that
   the fourth voltage amplitude is set to a voltage amplitude required for processing in a DA conversion circuit group for converting the display data signals to analog display signals.

5. The method of manufacturing a display apparatus according to claim 1, wherein said data processing circuit is formed via an interconnected pattern of thin-film transistors.

* * * * *